3,040,084
Patented June 19, 1962

3,040,084
4-SUBSTITUTED-1,1,2-TRICYANO-1,3-BUTADIENE AND PROCESS OF PREPARATION

John K. Williams, Wilmington, Del., assignor to E. I. du Pont de Nemours and Company, Wilmington, Del., a corporation of Delaware
No Drawing. Filed Apr. 25, 1960, Ser. No. 24,243
19 Claims. (Cl. 260—465)

The present invention is concerned with a new class of colored organic chemical compounds useful as dyes, and more particularly with selected 4-substituted-1,1,2-tricyano-1,3-butadienes and to a process for their preparation.

With the continued discovery of new synthetic fibers and the expanding use of these materials in clothing fabrics where colors and designs are of prime importance, there is an ever increasing need for new dyes with new chromophoric structures and with chemical characteristics which adapt them to new uses.

It is an object of this invention to provide a new class of colored organic chemical compounds useful as dyes. Another object is to provide selected 4-substituted-1,1,2-tricyano-1,3-butadienes and a novel process for their preparation. Other objects will appear hereinafter.

These and other objects of this invention are accomplished by providing the new class of 4-substituted-1,1,2-tricyano-1,3-butadienes having the formula

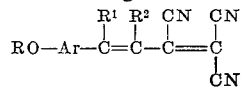

where $R^1$ and $R^2$ are hydrogen or hydrocarbyl groups free of aliphatic carbon-to-carbon unsaturation, Ar is arylene, and RO is a hydrocarbyloxy group free of aliphatic carbon-to-carbon unsaturation. R is a hydrocarbyl group free of aliphatic carbon-to-carbon unsaturation. This new class of 4-hydrocarbyloxyaryl-1,1,2-tricyano-1,3-butadienes includes the 4-alkoxyaryl-1,1,2-tricyano-1,3-butadienes, the 4-aryloxyaryl-1,1,2-tricyano-1,3-butadienes, the 4-aralkyloxyaryl-1,1,2-tricyano-1,3-butadienes, the 4-alkaryloxyaryl-1,1,2-tricyano-1,3-butadienes and the 4-cycloalkyloxyaryl-1,1,2-tricyano-1,3-butadienes.

The new class of 4-hydrocarbyloxyaryl-1,1,2-tricyano-1,3-butadienes of this invention can be prepared by a process in which the ring of the corresponding 3-hydrocarbyloxyaryl-1,1,2,2-tetracyanocyclobutane is opened. In this novel process a 3-hydrocarbyloxyaryl-1,1,2,2-tetracyanocyclobutane is heated in the presence of an alkanol, preferably a lower alkanol, such as methanol or ethanol. Temperatures in the range of 25 to 200° C. and above may be employed and temperature in the range of 50–100° C. are preferred. It is convenient, though not essential, to employ an excess of the alkanol as a reaction medium.

The process can be illustrated generically by the following equation:

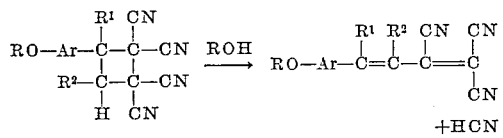

in which the R's are as previously defined.

When $R^1$ and $R^2$ are hydrogen, the process can be illustrated by the following equation:

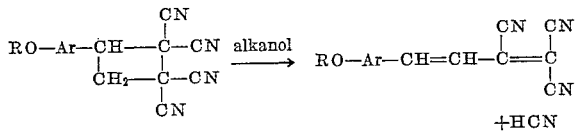

where Ar is arylene and RO is a hydrocarbyloxy radical free of aliphatic carbon-to-carbon unsaturation, such as alkoxy, aryloxy, aralkyloxy, alkaryloxy, and cycloalkyloxy radicals.

The 3 - hydrocarbyloxyaryl - 1,1,2,2 - tetracyanocyclobutanes are prepared by condensation of tetracyanoethylene with the corresponding hydrocarbyloxyarylethylenes as illustrated in Part A of Example I. The reaction of tetracyanoethylene with a hydrocarbyloxyarylethylene will occur simply on intimate contact of the reactants at room temperature. No additives or special conditions are needed. It is convenient, though not essential, to employ a diluent which is inert to the reactants and products to aid in dissipating the heat of reaction. Pressure and the proportions of reactants are not critical and may be varied widely. The 3-hydrocarbyloxyaryl-1,1,2,2-tetracyanocyclobutane reactants include 3-alkoxyaryl-, 3-aryloxyaryl-, 3-aralkyloxyaryl-, 3-alkaryloxyaryl- and 3-cycloalkyloxyaryl-1,1,2,2-tetracyanocyclobutanes.

The hydrocarbyl groups represented in R, $R^1$ and $R^2$ in the starting materials and products indicated above can be any radical composed solely of carbon and hydrogen and being free of aliphatic carbon-to-carbon unsaturation. "Hydrocarbyl" is used in its full generic sense. The term "hydrocarbyl" is consistent with chemical nomenclature and is synonymous with the term "hydrocarbon radical." The wide variation in the hydrocarbyl groups used in the illustrations which follow makes it evident that all hydrocarbyl groups free of aliphatic unsaturation are operable. Hydrocarbyl groups free of aliphatic carbon-to-carbon unsaturation include alkyl, cycloalkyl, aryl, aralkyl, alkaryl, single ring, multi ring, straight chain, branched chain, large, small, and the like. All aliphatically saturated hydrocarbyl radicals in the 3-hydrocarbyloxyaryl-1,1,2,2-tetracyanocyclobutanes pass through the process of this invention and appear unchanged in the product. The widest variation in these hydrocarbyl radicals free from aliphatic carbon-to-carbon unsaturation does not prevent the formation in this process of the products of this invention.

The limitations of space for disclosure are not to be construed as any limitation of the scope of "hydrocarbyl" contemplated in this invention. Even the most cumbersome saturated hydrocarbyl radicals such as those obtained by removing end groups from high molecular weight hydrocarbon polymer molecules containing thousands of carbon atoms, such as polyethylene, polyisobutylene, polystyrene, and the like, are fully operable.

It is obvious that aliphatically saturated hydrocarbyl groups containing 20 or fewer carbon atoms are most available, and to that extent preferred. But there is to be no question of the operability of, or of the intent to include and disclose, any hydrocarbyl group whatsoever, as long as it is free of aliphatic carbon-to-carbon unsaturation. Wide variations in size and structure of these hydrocarbyl radicals do not affect the ability of the butadienes to which they are attached to be used as dyes.

By arylene we mean generically any divalent aromatic radical. It is of the essence of an arylene radical that the two bond stem from different ring carbon atoms. Among arylene radicals are included those from which the corresponding aromatic compound obtained by placing hydrogens at the respective bonds of the arylene group, i.e., the parent compound whose valences are all satisfied, has a resonance energy of not less than 20 kcal./mole. Resonance energies of organic compounds and the determination of resonance energies are shown by Linus Pauling in "The Nature of the Chemical Bond," Second edition, Cornell University Press, 1945, pages 132–139.

Arylene groups particularly suitable in the compounds of this invention are those containing 20 or fewer carbon atoms and include the hydrocarbon arylenes, particularly phenylene, naphthylene, and anthrylene.

In the following example parts are by weight except where otherwise indicated. The example represents a preferred embodiment of this invention.

EXAMPLE

Part A

To a solution of 450 parts of tetracyanoethylene in 1776 parts of tetrahydrofuran at 0° C. is added 497 parts of p-methoxystyrene. The deep blue color which forms immediately upon mixing fades to gray and a solid precipitate starts to form within about 10 minutes. After 30 minutes, the cold solution is diluted with 3300 parts of petroleum ether and stirred at 0° C. for another 15 minutes. The solid precipitate is collected by filtration and washed with petroleum ether. The crude material weighs 830 parts. It is recrystallized two times from 1,2-dichloroethane to yield 3-(p-methoxyphenyl)-1,1,2,2-tetracyanocyclobutane, melting at 182–183° C.

Part B

A mixture of 50 parts of 3-(p-methoxyphenyl)-1,1,2,2-tetracyanocyclobutane and 793 parts of methanol is heated at reflux. After two hours dark red crystals are seen forming in the mixture. After a total of 24 hours at reflux, the mixture is cooled to 0° C. and 29 parts of 4-(p-methoxyphenyl)-1,1,2-tricyano-1,3-butadiene is obtained in the form of dark red crystals. This is collected by filtration, washed with methanol, and recrystallized twice from acetonitrile to yield a purified product melting at 214.5–215.5° C. The infrared absorption spectrum of this product shows bands at 4.51 microns (conjugated —CN), 6.31 and 6.57 microns (C≡C), 6.20 and 6.69 microns (benzene ring), and at 11.95 microns (1,4-disubstituted benzene). The ultraviolet absorption spectrum of an acetonitrile solution of the product shows peaks at 278 millimicrons (molecular extinction coefficient 8,840), 445 millimicrons (molecular extinction coefficient 38,500) and shoulders at 303 and 320 millimicrons.

*Analysis.*—Calcd. for $C_{14}H_9N_3O$: C, 71.49; H, 3.86; N, 17.87; M.W., 2.35. Found: C, 71.57; H, 4.02; N, 17.82; N.W., 260.

When the hydrocarbyloxyaryl substituted ethylenes shown in the first column of the following table are used in place of p-methoxystyrene in the procedure of Part A of the example, there are obtained the 3-hydrocarbyloxyaryl-1,1,2,2-tetracyanocyclobutanes of the second column which on ring opening with methanol as shown in Part B of the example yield respectively the 4-hydrocarbyloxyaryl-1,1,2-tricyano-1,3-butadienes shown in the last column.

TABLE

| Hydrocarbyloxyaryl substituted ethylene | 3-hydrocarbyloxyaryl-1,1,2,2-tetracyanocyclobutane Intermediate | Butadiene formed on ring opening with methanol |
|---|---|---|
| o-methoxystyrene | 3-(o-methoxyphenyl)-1,1,2,2-tetracyanocyclobutane. | 4-(o-methoxyphenyl)-1,1,2-tricyano-1,3-butadiene. |
| p-ethoxystyrene | 3-(p-ethoxyphenyl)-1,1,2,2-tetracyanocyclobutane. | 4-(p-ethoxyphenyl)-1,1,2-tricyano-1,3-butadiene. |
| p-phenoxystyrene | 3-(p-phenoxyphenyl)-1,1,2,2-tetracyanocyclobutane. | 4-(p-phenoxyphenyl)-1,1,2-tricyano-1,3-butadiene. |
| p-methoxystilbene | 3-(p-methoxyphenyl)-4-phenyl-1,1,2,2-tetracyanocyclobutane. | 4-(p-methoxyphenyl)-3-phenyl-1,1,2-tricyano-1,3-butadiene. |

All hydrocarbyloxyaryl butadienes of this invention obtainable by variation of hydrocarbyl groups within the herein stated definitions are hereby disclosed. The 4-hydrocarbyloxyaryl-1,1,2-tricyano-1,3-butadienes of this invention are all colored compounds which are useful as dyes. This is illustrated with the product of the example as follows.

EXAMPLE A

A solution of 2 parts of 4-(p-methoxyphenyl)1,1,2-tricyano-1,3-butadiene in a mixture of 10 parts of 6 N aqueous hydrochloric acid and 235 parts of acetonitrile is added to a solution of 2 parts of a sulfonated lignin dispersant in 2000 parts of water. The whole is made up to a total of 20,000 parts by addition of water. The resulting dye bath has a pH of 5. Cloth swatches made of cellulose acetate, nylon, silk, and wool are added and the bath is heated at 80°–100° C. for 30 minutes. The cloth swatches are rinsed with water and dried. By this treatment the cellulose acetate is dyed yellow-orange in color; the nylon is dyed beige; the silk is dyed golden brown; and the wool is dyed tan.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A 4-hydrocarbyloxyaryl-1,1,2-tricyano-1,3-butadiene having the formula

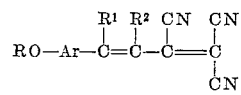

where $R^1$ and $R^2$ are selected from the group consisting of hydrogen and hydrocarbyl groups free of aliphatic carbon-to-carbon unsaturation, Ar is arylene which is entirely hydrocarbon of no more than 20 carbons and has the two bonds stemming from different carbons of the arylene ring, and RO is a hydrocarbyloxy group free of aliphatic carbon-to-carbon unsaturation.

2. A 4-hydrocarbyloxyaryl-1,1,2-tricyano-1,3-butadiene having the formula

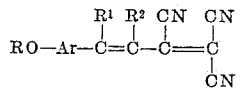

where $R^1$ and $R^2$ are hydrocarbyl groups free of aliphatic carbon-to-carbon unsaturation, Ar is arylene which is entirely hydrocarbon of no more than 20 carbons and has the two bonds stemming from different carbons of the arylene ring, and RO is a hydrocarbyloxy group free of aliphatic carbon-to-carbon unsaturation.

3. A 4-hydrocarbyloxyaryl-1,1,2-tricyano-1,3-butadiene having the formula

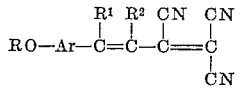

where one of the groups $R^1$ and $R^2$ is hydrogen and the other is a hydrocarbyl group free of aliphatic carbon-to-carbon unsaturation, Ar is arylene which is entirely hydrocarbon of no more than 20 carbons and has the two bonds stemming from different carbons of the arylene ring, and RO is a hydrocarbyloxy group free of aliphatic carbon-to-carbon unsaturation.

4. A 4-hydrocarbyloxyaryl-1,1,2-tricyano-1,3-butadiene having the formula

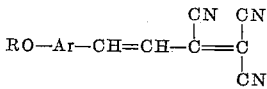

where Ar is arylene which is entirely hydrocarbon of no more than 20 carbons and has the two bonds stemming from different carbons of the arylene ring, and RO is a hydrocarbyloxy group free of aliphatic carbon-to-carbon unsaturation and of no more than 20 carbons.

5. A 4-hydrocarbyloxyaryl-1,1,2-tricyano-1,3-butadiene having the formula

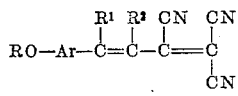

where $R^1$ and $R^2$ are hydrocarbyl groups free of aliphatic carbon-to-carbon unsaturation, Ar is arylene which is entirely hydrocarbon of no more than 20 carbons and has the two bonds stemming from different carbons of the arylene ring, and RO is alkoxy.

6. A 4-hydrocarbyloxyaryl-1,1,2-tricyano-1,3-butadiene having the formula

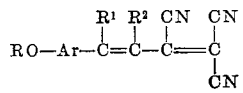

where one of the groups $R^1$ and $R_2$ is hydrogen and the other is a hydrocarbyl group free of aliphatic carbon-to-carbon unsaturation, Ar is arylene which is entirely hydrocarbon of no more than 20 carbons and has the two bonds stemming from different carbons of the arylene ring, and RO is alkoxy.

7. A 4-hydrocarbyloxyaryl-1,1,2-tricyano-1,3-butadiene having the formula

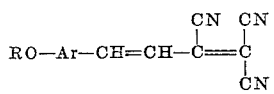

where Ar is arylene which is entirely hydrocarbon of no more than 20 carbons and has the two bonds stemming from different carbons of the arylene ring, and RO is alkoxy.

8. A 4-hydrocarbyloxyaryl-1,1,2-tricyano-1,3-butadiene having the formula

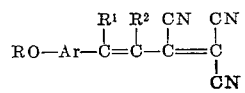

where $R^1$ and $R^2$ are hydrocarbyl groups free of aliphatic carbon-to-carbon unsaturation, Ar is phenylene, and RO is alkoxy.

9. A 4-hydrocarbyloxyaryl-1,1,2-tricyano-1,3-butadiene having the formula

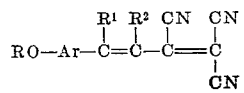

where one of the groups $R^1$ and $R^2$ is hydrogen and the other is a hydrocarbyl group free of aliphatic carbon-to-carbon unsaturation and of no more than 20 carbons, A is phenylene, and RO is alkoxy of no more than 20 carbons.

10. A 4-hydrocarbyloxyaryl-1,1,2-tricyano-1,3-butadiene having the formula

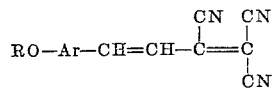

where Ar is phenylene, and RO is alkoxy of no more than 20 carbons.

11. 4-(p-methoxyphenyl)-1,1,2-tricyano-1,3-butadiene.

12. Process which comprises heating in the range of 25 to 200° C. and in contact with a lower alkanol, a 3-hydrocarbyloxyaryl-1,1,2,2-tetracyanocyclobutane having the formula

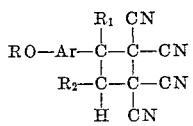

where $R^1$ and $R^2$ are selected from the group consisting of hydrogen and hydrocarbyl groups free of aliphatic carbon-to-carbon unsaturation, Ar is arylene which is entirely hydrocarbon of no more than 20 carbons and has the two bonds stemming from different carbons of the arylene ring, and RO is a hydrocarbyloxy group free of aliphatic carbon-to-carbon unsaturation, and obtaining as the resulting product a 4-hydrocarbyloxyaryl-1,1,2-tricyano-1,3-butadiene.

13. Process which comprises heating in the range of 25 to 200° C. and in contact with a lower alkanol, a 3-hydrocarbyloxyaryl-1,1,2,2-tetracyanocyclobutane having the formula

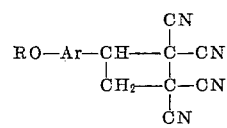

where Ar is arylene which is entirely hydrocarbon of no more than 20 carbons and has the two bonds stemming from different carbons of the arylene ring, and RO is a hydrocarbyloxy group free of aliphatic carbon-to-carbon unsaturation, and obtaining as the resulting product a 4-hydrocarbyloxyaryl-1,1,2-tricyano-1,3-butadiene.

14. Process which comprises heating in the range of 25 to 200° C. and in contact with a lower alkanol, a 3-hydrocarbyloxyaryl-1,1,2,2-tetracyanocyclobutane having the formula

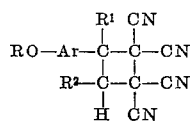

where one of the groups $R^1$ and $R^2$ is hydrogen and the other is a hydrocarbyl group free of aliphatic carbon-to-carbon unsaturation, Ar is arylene which is entirely hydrocarbon of no more than 20 carbons and has the two bonds stemming from different carbons of the arylene ring, and RO is alkoxy, and obtaining as the resulting product a 4-hydrocarbyloxyaryl-1,1,2-tricyano-1,3-butadiene.

15. Process which comprises heating in the range of 25 to 200° C. and in contact with a lower alkanol, a 3-hydrocarbyloxyaryl-1,1,2,2-tetracyanocyclobutane having the formula

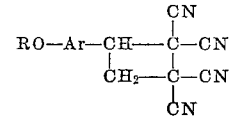

where Ar is arylene which is entirely hydrocarbon of no more than 20 carbons and has the two bonds stemming from different carbons of the arylene ring, and RO is alkoxy, and obtaining as the resulting product a 4-hydrocarbyloxyaryl-1,1,2-tricyano-1,3-butadiene.

16. Process which comprises heating in the range of 25 to 200° C. and in contact with a lower alkanol, a 3-hydrocarbyloxyaryl-1,1,2,2-tetracyanocyclobutane having the formula

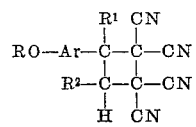

where $R^1$ and $R^2$ are hydrocarbyl groups free of aliphatic carbon-to-carbon unsaturation, Ar is phenylene, and RO is alkoxy, and obtaining as the resulting product a 4-hydrocarbyloxyaryl-1,1,2-tricyano-1,3-butadiene.

17. Process which comprises heating in the range of 25 to 200° C. and in contact with a lower alkanol, a 3-hydrocarbyloxyaryl-1,1,2,2-tetracyanocyclobutane having the formula

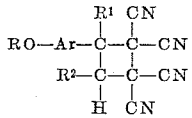

where one of the groups $R^1$ and $R^2$ is hydrogen and the other is a hydrocarbyl group free of aliphatic carbon-to-carbon unsaturation, Ar is phenylene, and RO is alkoxy, and obtaining as the resulting product a 4-hydrocarbyloxyaryl-1,1,2-tricyano-1,3-butadiene.

18. Process which comprises heating in the range of 25 to 200° C. and in contact with a lower alkanol, a 3-hydrocarbyloxyaryl-1,1,2,2-tetracyanocyclobutane having the formula

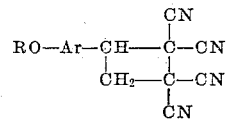

where Ar is phenylene, and RO is alkoxy of no more than 20 carbons, and obtaining as the resulting product a 4-hydrocarbyloxyaryl-1,1,2-tricyano-1,3-butadiene.

19. Process which comprises heating in the range of 25 to 200° C. and in contact with a lower alkanol, 3-(p-methoxyphenyl)-1,1,2,2-tetracyanocyclobutane and obtaining as the resulting product 4-(p-methoxyphenyl)-1,1,2-tricyano-1,3-butadiene.

References Cited in the file of this patent

UNITED STATES PATENTS 2,762,833     Heckert _____ Sept. 11, 1956